United States Patent
Kesavan et al.

(10) Patent No.: US 8,828,914 B2
(45) Date of Patent: Sep. 9, 2014

(54) METHODS FOR CONTROLLING DEPOLYMERIZATION OF POLYMER COMPOSITIONS

(75) Inventors: Subramanian Kesavan, East Windsor, NJ (US); Gary Woodward, Northwich Cheshire (GB); Adedamola Adedeji, Carteret, NJ (US); Timothy Curtis, East Windsor, NJ (US); Francis Smith, Forked River, NJ (US)

(73) Assignee: Rhodia Operations (FR)

( * ) Notice: Subject to any disclaimer, the term of this patent is extended or adjusted under 35 U.S.C. 154(b) by 195 days.

(21) Appl. No.: 12/658,653

(22) Filed: Feb. 12, 2010

(65) Prior Publication Data

US 2010/0204068 A1    Aug. 12, 2010

Related U.S. Application Data

(60) Provisional application No. 61/207,480, filed on Feb. 12, 2009, provisional application No. 61/273,545, filed on Aug. 5, 2009.

(51) Int. Cl.
*C09K 8/22*    (2006.01)
*C09K 8/68*    (2006.01)
*C09K 8/60*    (2006.01)
*C09K 8/88*    (2006.01)

(52) U.S. Cl.
CPC . *C09K 8/68* (2013.01); *C09K 8/605* (2013.01); *C09K 8/88* (2013.01); *C04B 37/0096* (2013.01); *Y10S 507/92* (2013.01)

USPC ............ 507/128; 507/200; 507/211; 507/920

(58) Field of Classification Search
CPC ............ C09K 8/04; C09K 8/20; C09K 8/605; Y10S 507/92
USPC ................... 507/200, 211, 920, 128
See application file for complete search history.

(56) References Cited

U.S. PATENT DOCUMENTS

| | | | |
|---|---|---|---|
| 3,240,737 A | 3/1966 | McKennon | 260/29.2 |
| 3,728,331 A | 4/1973 | Savage | 260/231 R |
| 4,076,755 A | 2/1978 | Lippsmeier et al. | 260/606.5 |
| 4,154,890 A | 5/1979 | Wagner | 428/276 |

(Continued)

FOREIGN PATENT DOCUMENTS

| | | | |
|---|---|---|---|
| EP | 0 030 443 A1 | 2/1980 | C08B 37/14 |
| WO | PCT/US93/00725 | 1/1993 | C08B 37/00 |

OTHER PUBLICATIONS

NACE Publication 08658 published 2008, "Use of Microbiocides in Barnett Shale Gas Well Fracturing Fluids to Control Bacteria Related Problems".

(Continued)

*Primary Examiner* — Aiqun Li
(74) *Attorney, Agent, or Firm* — Ohlandt, Greeley, Ruggiero & Perle, L.L.P.

(57) ABSTRACT

A method of controlling or arresting the rate of depolymerization of a polymer composition during a biocide treatment by controlling the pH of the composition, and use of such methods in oilfield applications.

21 Claims, 3 Drawing Sheets

(56) References Cited

U.S. PATENT DOCUMENTS

| | | | |
|---|---|---|---|
| 4,753,659 A | 6/1988 | Bayerlein et al. | 8/561 |
| 4,874,854 A | 10/1989 | Colegrove et al. | 536/114 |
| 5,247,995 A | 9/1993 | Tjon-Joe-Pin et al. | 166/312 |
| 5,708,162 A | 1/1998 | Hilbig et al. | 536/124 |
| 6,001,158 A | 12/1999 | Elphingstone et al. | 106/18.31 |
| 6,818,594 B1 | 11/2004 | Freeman et al. | 507/101 |
| 6,884,884 B2 | 4/2005 | Magallanes et al. | 536/114 |
| 7,259,192 B2 | 8/2007 | Liu et al. | 522/88 |
| 2003/0092584 A1* | 5/2003 | Crews | 507/200 |
| 2008/0032903 A1* | 2/2008 | Starkey et al. | 507/211 |
| 2008/0277620 A1 | 11/2008 | Kesavan et al. | 252/175 |

OTHER PUBLICATIONS

D.K. Ramsden & K. McKay "Degradation of Polyacrylamide in Aqueous Solution Induced by Chemically Generated Hydroxyl Radicals: Part I—Fenton's Reagent", Polymer Degradation and Stability 14 (1986) pp. 217-229.

Yu, et al., "Preparation of polysaccharides in different molecular weights from Ulva pertusa Kjellm (Chorophyta)", by Yu, Chinese J. Oceanology and Limnology, vol. 22, No. 4 (2004) pp. 381-385.

Shao et al., "Mechanism of Chrome-free Tanning with Tetrahydroxymethyl Phosphonium Chloride", Chinese J. Chem. Engr., vol. 16, No. 3, (2008) pp. 446-450.

* cited by examiner

EFFECT OF THPS

METHODS FOR CONTROLLING DEPOLYMERIZATION OF POLYMER COMPOSITIONS

CROSS-REFERENCE TO RELATED APPLICATIONS

This application claims the benefit of U.S. Provisional Application Ser. No. 61/207,480, filed Feb. 12, 2009, and U.S. Provisional Application Ser. No. 61/273,545, filed Aug. 5, 2009, herein incorporated by reference.

FIELD OF THE INVENTION

This invention relates to methods of controlling depolymerization of polymer and polymer compositions and the preparation thereof, and in particular, to methods of controlling depolymerization of polymer compositions in industrial applications and methods of controlling depolymerization of guar composition in well and oilfield applications.

BACKGROUND OF THE INVENTION

Bacterial contamination of industrial applications (e.g., drilling fluids such as fracturing fluids or in water injection systems) is a source of problems. For example, microorganisms in oilfields, in injection water or industrial application where water is collected from ponds or similar water sources may include iron-oxidizing bacteria, sulfate-reducing bacteria, slime-forming bacteria, sulfide oxidizing bacteria, yeast and molds, and protozoa.

Some industrially utilized fluids contain natural or synthetic polymers in their formulation that provide a food source to bacterial populations. Bacterial growth can result in souring of the crude oil in a reservoir, which is caused by the reduction of inorganic sulfate compounds to sulfides by certain bacteria. Bacterial metabolism can generate deleterious products, for example, hydrogen sulfide that aside from being a toxic gas can lead to decomposition of mud polymers, formation of problematic solids, such as iron sulfide, and/or corrosive action on drilling tubes and drilling hardware.

U.S. Pat. No. 3,240,737 discusses degradation of polyacrylamide and other water soluble polymers using ferrous salts and a ferric ion chelating agent in an oxygenated system. U.S. Pat. No. 6,884,884 to Magallanes et al. discusses the depolymerization of polymers and in particular, polysaccharides.

SUMMARY OF THE INVENTION

Biocides are used to treat water and destroy bacteria or a substantial amount of bacteria during a biocide treatment. This is especially important when the water source is from a pond, lake, pit or produced water from an oil well etc. Several biocides such as glutaraldehyde, tetrakis(hydroxymethyl) phosphonium sulfate ("THPS"), etc. can be used to destroy bacteria present in such source water. When THPS was used as biocide in oilfield application fluids such as fracturing fluids or slickwater fluids, it was observed that there was a significant decrease in the viscosity of the fluid. It is understood that "oilfield application fluid" means any fluid utilized in the processing, extraction or treatment of oil, typically as a fracturing fluid, stimulation fluid, or slickwater fluid, but not necessarily limited to such.

Typical fracturing fluids contain a polysaccharide, mainly guar or guar derivatives, or other polymers such as polyacrylamide. It would be desirable to use THPS as a biocide and still maintain the viscosity of the fracturing fluid.

It is also desirable to be able to control depolymerization of polymer compositions, including polysaccharide compositions, in industrial applications including but not limited to oilfield, well, slickwater, paper processing, and other industrial applications. It is also desirable to be able to control the viscosity in aqueous compositions having an effective amount of biocide.

In one aspect, the present invention is a method for depolymerizing a polymer, typically guar or polyacrylamide, comprising contacting the polymer with an effective amount of THPS or tris(hydroxymethyl) phosphine (THMP) or a tetrakis(hydroxymethyl)phosphonium salt (THP salt), typically in an aqueous mixture. The effective amount of THPS or THMP or a THP salt is at or greater than about 25 ppm in one embodiment, at or greater than about 50 ppm in other embodiments, at or greater than about 75 ppm in other embodiments, at or greater than about 100 ppm in other embodiments, at or greater than 15 ppm in other embodiments, while in still other embodiments the effective amount of THPS or THMP or a THP salt is greater than about 1000 ppm, and further in other embodiments greater than about 10,000 ppm. While reference is made to THPS in some aspects/embodiment listed below, it is understood that THMP or THP salt may also be substituted for THPS. It is also understood that THMP, THP salt and THPS can be used interchangeably.

In another aspect, the present invention is a method of controlling the rate of depolymerization of a polymer in an aqueous polymer composition comprising, or in some embodiments consisting essentially of: Obtaining an aqueous mixture comprising a tetrakis(hydroxymethyl)phosphonium salt (THP salt) in an amount greater than about 25 ppm; Adjusting the pH of the THP salt-water mixture; and Contacting the THP salt-water mixture with a polymer to form an aqueous polymer composition. In some embodiments, the step of adjusting means contacting a predetermined amount of a pH buffer to the THPS-water mixture.

The viscosity of the aqueous polymer composition can be maintained at a substantially constant level after a predetermined time, which can mean that the viscosity is not less than 55% of an initial viscosity, in other embodiments, not less than 65% of the initial viscosity, in other embodiments, not less than 70% of the initial viscosity, in other embodiments, not less than 75% of the initial viscosity, in other embodiments, not less than 80% of the initial viscosity, in other embodiments, not less than 85% of the initial viscosity, in other embodiments, not less than 90% of the initial viscosity, and in other embodiments, not less than 95% of the initial viscosity. The predetermined time can vary but is, in some embodiments, 30 minutes, in other embodiments, 60 minutes, in other embodiments, 1 hour, in other embodiments, 2 hours, in other embodiments, 4 hours, in other embodiments, 24 hours, in other embodiments, 4 days.

In yet another aspect, the present invention is a method of controlling the rate of depolymerization of a polymer during a biocide treatment in preparing an oil field application fluid, comprising: Contacting a pH buffer with the aqueous mixture in an amount effective to maintain an aqueous mixture within a pH range of from about 3 to about 12; Contacting THP salt in amount effective to reduce bacteria count in the aqueous mixture with the aqueous mixture, wherein pH of the aqueous mixture is maintained within a pH range of from about 6 to about 12; and Contacting with the aqueous mixture with a polymer.

In another aspect, the present invention is a method of controlling the rate of depolymerization of a polymer during a biocide treatment in preparing an oil field application fluid, consisting essentially of: Contacting a pH buffer with the aqueous mixture in an amount effective to maintain an aqueous mixture within a pH range of from about 3 to about 12; Contacting THP salt in amount effective to reduce bacteria count in the aqueous mixture with the aqueous mixture, wherein pH of the aqueous mixture is maintained within a pH range of from about 6 to about 12; and Contacting the aqueous mixture with a polymer.

In some embodiments, the amount of pH buffer utilized is effective to maintain the aqueous mixture within a pH of from about 3 to about 12. In other embodiments, the amount of pH buffer utilized is effective to maintain the aqueous mixture within a pH of from about 6 to about 8, or in other embodiments, a pH of from about 7 to about 8. It is understood that the steps of any of the methods described herein can be done in any order irrespective of the sequence or lettering which could indicate progression. For example, the step of contacting the pH buffer with the aqueous mixture can occur prior to the step of contacting THP salt with the aqueous mixture and/or prior to the step of contacting the aqueous mixture with a polymer.

DETAILED DESCRIPTION

Figure 1:
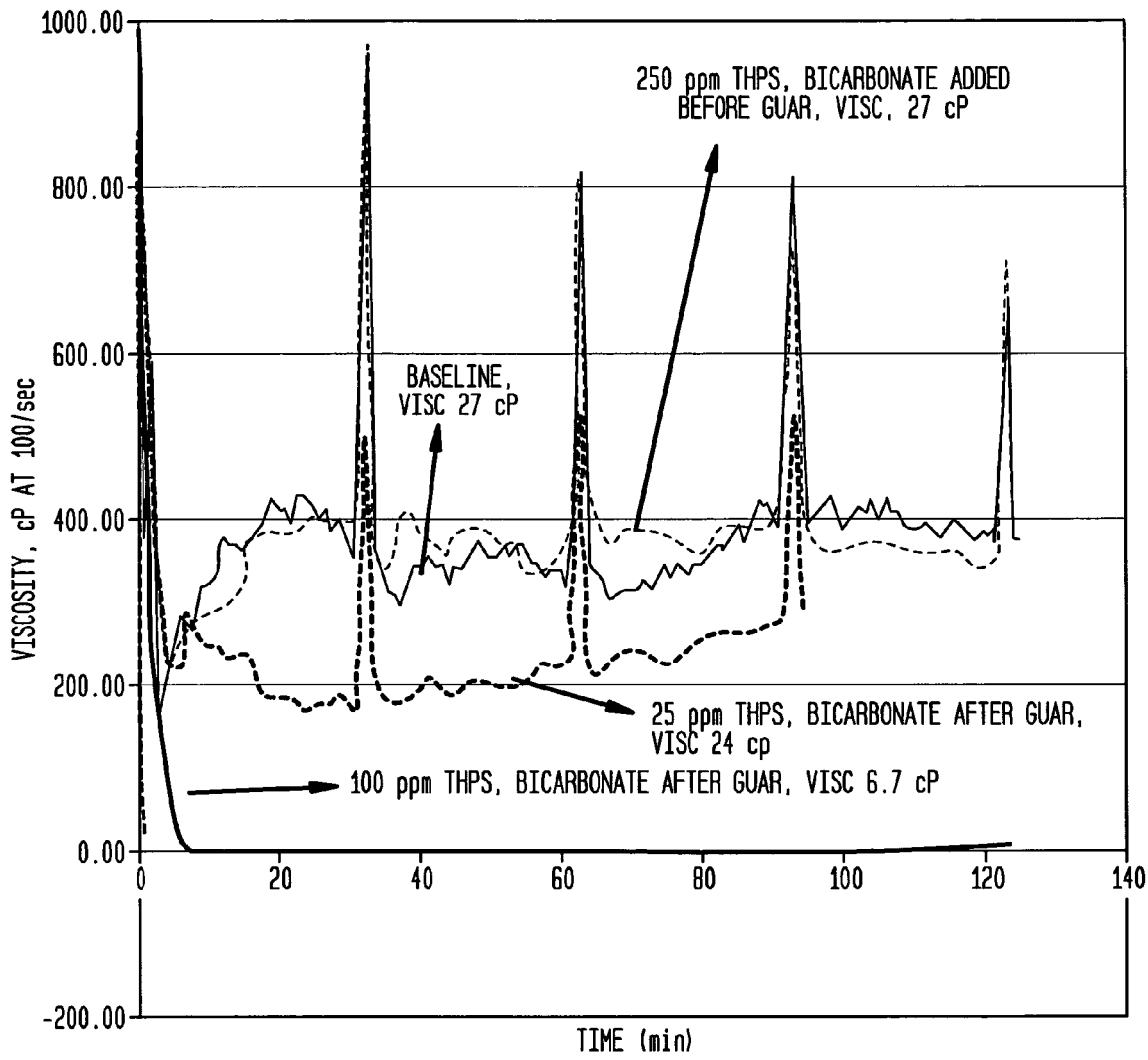
FIG. 1 illustrates the effect of THPS on Guar-Borax crosslinking with varying amounts of THPS and with varying the timing of buffer addition.

As used herein, the term "alkyl" means a saturated straight chain, branched chain, or cyclic hydrocarbon radical, including but not limited to, methyl, ethyl, n-propyl, iso-propyl, n-butyl, sec-butyl, t-butyl, pentyl, iso-amyl, n-hexyl, and cyclohexyl.

Natural polymers such as guar and guar derivatives, and synthetic polymers such as polyacrylamide, polyacrylic acid, polyvinyl alcohol and their copolymers are used in a variety of industrial applications. Typically, these polymers are included in an aqueous mixture with other components suitable for the industrial application being utilized. In some applications, there is a need to degrade the polymers and lower the viscosity. In other applications, there is a need to degrade them to low molecular weight materials so that they can be further treated to make them biodegradable.

In oilfield applications, natural polymers such as guar or guar derivatives as well as synthetic polymers, mainly polyacrylamides and copolymers containing polyacrylamides, are used in a variety of applications, such as, slickwater fracturing, fracturing, drilling, cementing, enhanced oil recovery etc. In applications, such as slickwater fracturing, fracturing etc., it is desirable to have the polymer maintain a viscosity for a short period of time (for example, 30 minutes to 24 hours, or longer) and then degrade.

It is understood that the present invention may be used in a variety of other applications and industrial applications such as water treatment applications such as process water, e.g. in pulp and paper manufacture, aerobic water systems, as well as in anaerobic systems, water used in hydrostatic testing. Particularly the present invention is suitable in systems where bacteria can proliferate and/or there is a desire or need to control viscosity.

It has been observed that an increase of a biocide, and in particular, tetrakis(hydroxymethyl)phosphonium sulfate (THPS), tris(hydroxymethyl)phosphine (THMP) or a tetrakis (hydroxymethyl)phosphonium salt (THP salt), in an application fluid containing a polymer (e.g., a synthetic or natural polymer) results in a decrease in the viscosity of such fluid.

For example, solutions of polyacrylamide or copolymers of polyacrylamide-co-acrylic acid when mixed with tetrakis (hydroxymethyl)phosphonium sulfate (THPS) at low levels (500-1000 ppm) exhibited an unexpected reduction in viscosity along with a corresponding molecular weight reduction. This behavior is a function of the pH and is more rapid at lower pH (<7), and slower at higher pH (>7). This behavior can be utilized to depolymerize polyacrylamide or other water soluble polymers in a controlled manner without using harsh environments such as strong acids, strong alkalines or strong oxidizers. The main advantages are the ability of THPS to depolymerize water soluble synthetic polymers such as polyacrylamides, polyacrylic acid and copolymers containing acrylamide, as well as natural polymers such as guar or guar derivatives.

Depolymerization can occur at temperatures typical in utilizing such applications, including at room temperature. This ability to depolymerize at room temperature is typical, but not necessary. The ability to adjust the pH to control the rate of depolymerization is a desirable characteristic. The ability of THPS to perform the dual function of acting as a biocide and also depolymerize is also desirable.

Without being bound by theory, it is believed that degradation of polymers including polyacrylamide or other water soluble synthetic polymers at neutral or higher pH can be controlled to slowly degrade the polymers over a period of time. The ability to control the rate of depolymerization in industrial applications such as fracturing in oilfield is desirable, where the high viscosity is desired for a certain period of time and then the viscosity needs to be reduced. This is also useful in slickwater fracturing applications in oilfield where high friction reduction using high molecular weight polymers (e.g., polyacrylamides) is important but it is also desirable to decrease the molecular weight over a long period of time. This ability to control the depolymerization using pH is very useful in these oilfield applications.

In another embodiment, the polymer is guar or a guar derivative. Guar or guar derivatives when mixed with tetrakis (hydroxymethyl)phosphonium sulfate (THPS) at low levels (10-1000 ppm) exhibited an unexpected reduction in viscosity of the application fluid along with a corresponding molecular weight reduction. This is generally pronounced when the biocide is in an amount greater than 25 ppm biocide in water.

In one embodiment, the biocide is THPS or THMP or a THP salt. In one particular embodiment, the THP salt is tetrakis(hydroxymethyl)phosphonium sulphate (THPS). Alternatively, the THP salt may be tetrakis(hydroxymethyl) phosphonium chloride, phosphate, bromide, carbonate, acetate, citrate, formate, lactate, borate or any acceptable salt. The salt is typically the sulphate, chloride or phosphate. However any water soluble salt may be used including the phosphite, bromide, fluoride, carbonate, acetate, formate, citrate, borate, or silicate.

In another embodiment, the biocide is A phosphine or phosphonium compound with 1 or more hydroxyalkyl groups attached to each phosphorus atom. The phosphorus compound may contain one phosphorus atom and may then be of formula [HORPR'$_n$O$_m$]$_y$X$_x$ wherein n is 2 or 3; m is 0 or 1 such that (n+m)=2 or 3; x is 0 or 1 such that (n+x)=2 or 4; y is equal to the valency of X; R is an alkylene group of 1 to 4, typically 1, carbon atoms with the hydroxy group attached to the 1, 2, 3 or 4 numbered carbon atom; each R' may be the same or different and represents an alkyl or alkenyl group, typically of 1-4 carbon atoms, or more usually a group of formula HOR—, wherein R is as defined above; and X is anion such that the phosphorus compound is water soluble. The (—ROH) group may be a 1-, or 2-hydroxyalkyl group, e.g., a hydroxy methyl, 1 or 2 hydroxy ethyl 1 or 2 hydroxypropyl or 1 or 2 hydroxy-butyl group; typically at least one R' is ROH, but may be for example a methyl, ethyl, propyl, isopropyl, or n-sec-, iso- or tert-butyl group. X may be a monovalent anion such as chloride or bromide, or an organic carboxylate, e.g. an alkane carboxylate, typically of 2-5 carbon atoms such as acetate, bisulphite or bisulphate or an organic sulphonate such as methosulphate or a benzene, toluene or xylene sulphonate or a dihydrogen phosphate, or a divalent anion such as sulphate or sulphite or 35 monohydrogen phosphate or a trivalent group such as phosphate or organic carboxylates with 2 or more carboxyl groups such as citrate. The phosphorus compound may also be a phosphine oxide.

The phosphorus compound may alternatively contain 2 or more phosphorus atoms, so long as the phosphorus compound is water soluble to a concentration of at least 0.5 g/l at 25° C. Such phosphorus compounds contain at least 1 hydroxy alkyl group, usually per phosphorus atom, and typically at least 2 hydroxyalkyl groups per phosphorus atom. Such hydroxyalkyl groups are typically of formula ROH, where R is as defined above. The group or groups joining the phosphorus atoms together may of formula —R—, —R—O—, —R—O—R— or —R—NH—R or —R—R"—R— where R is as defined above and R' is the residue formed by removal of two hydrogen atoms, bonded to nitrogen, from a di or polyamide or di or poly amine, such as urea, dicyandiamide, thiourea or guanidine. Such compounds with 2 or more, e.g. 3, hydroxyalkyl groups per phosphorus atom may be made by self condensation of compounds with 3 or 4 hydroxyalkyl groups attached to one phosphorus atom, e.g. of formula [HORPR'$_n$O$_m$]$_y$X$_x$ or with a compound of formula R"2 such as urea. The condensation can be performed by heating at 40-120° C. Typically, the phosphorus compound contains only one phosphorus atom and 3 or 4 hydroxyalkyl groups especially hydroxymethyl groups. Such compounds are made by reacting phosphine with an aldehyde 50 usually formaldehyde or a ketone in the presence of mineral acid usually hydrochloric, sulphuric or phosphoric acid. Depending on the proportions the product may be a tris hydroxyalkyl phosphine or tetrakis(hydroxyalkyl)phosphonium salt.

Specific examples of biocides include but is understood to be not limited to: tetrakis(hydroxymethyl)phosphonium sulphate, tetrakis(hydroxymethyl) phosphonium chloride, tetrakis(hydroxymethyl)phosphonium phosphate and tris(hydroxymethyl)phosphine oxide as typical examples and dodecyl tris(hydroxymethyl)phosphonium chloride or oleyl tris(hydroxymethyl)phosphonium sulphate.

The fluid is typically an oilfield application fluid such as a fracturing fluid, but can encompass any fluid in which a polysaccharide is utilized, including but not limited to slickwater and fracturing fluid. It has been observed that adding THMP or THP salt to a fluid lowers the pH.

It thus has been surprisingly discovered that raising or lower the pH of the application fluid controls the rate of depolymerization of the polymer. The mixture of aqueous polymer-THPS causes depolymerization of the polymer. The depolymerization of the polymer and resulting viscosity loss is faster (i.e., at a relatively increased rate) as the pH of the fluid is lowered.

Polymers

Polymers that can be used in connection with the present invention include natural polymers such as polysaccharides, derivatives of natural polymers, synthetic polymers, biopolymers, and the like, or any mixtures thereof.

In one embodiment, the polymer is a synthetic polymer. Synthetic polymers include, but are not limited to, polyacrylamide, poly(methacrylic acid), polyvinylpyrrolidone, poly (acrylic acid), polyacrylate, polyethyleneimine, polyalkylacrylate, poly(ethylene glycol), polypropylene glycol, poly (vinyl alcohol), polyglycerol, polytetrahydrofuran, polyamide, derivates of or copolymers of any of the foregoing.

The polymers of the present invention can be copolymers. The present invention may employ polymerizable reactive monomers to form a polymer or copolymer. The copolymers may be block copolymers, which include but are not limited to di-block copolymers, tri-block copolymers, comb copolymers or random-block copolymers.

The copolymer can be comprised of blocks, linear backbones, side chains, grafts or branches of microgels or stars, cores of microgels of stars, or parts of polymeric chains having different concentrations of different monomeric units. Thus, the copolymer can include, but is understood not to be limited to, the following structures: (1) block copolymer comprising at least two blocks, part A corresponding to one block, part B corresponding to another block; (2) comb copolymer or grafted copolymer, having a backbone and side chains, with part A corresponding to the backbone and part B corresponding to side chains, or with part B corresponding to the skeleton and part A corresponding to side chains; (3) star copolymer or microgel copolymer or gelled micelle copolymer, comprising a polymeric core or non polymeric core, and peripheral polymeric chains, one part A or B corresponding to the core, and the other part corresponding to peripheral polymeric chains.

In one embodiment, the copolymer is a block copolymer. By block copolymer, it is meant a copolymer comprising at least two different blocks, block A and block B, linked together. The block copolymer is a sequenced polymer, for example a di-block or a tri-block copolymer. Blocks may also be random copolymers. Examples of linear sequences block copolymers are (block A)-(block B) di-block copolymers, (block A)-(block B)-(block A) tri-block copolymers, and (block B)-(block A)-(block B) tri-block copolymers. By linear polymer, it is meant a linear homopolymer, or a linear random copolymer, as opposed to a block copolymer.

A block or part is usually defined by the repeating units it comprises. A block or part may be a copolymer, comprising several kind of repeating units, deriving form several monomers. Hence, block or part A and block or part B may be different polymers, deriving from different monomers, but they may comprise some common repeating units (copolymers).

Examples of units (in part A, for example block A, or in part B, for example block B), derived from monomers include units derived from monomers (but is understood not to be only limited to) of:

alkylesters of an alpha-ethylenically-unsaturated, typically mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate, vinyl versatate, acrylonitrile, vinyl nitriles, vinylamine amides, vinylaromatic compounds such as styrene,
ethylene oxide,
vinyl alcohol,
vinyl pyrrolidone,
acrylamide, methacrylamide,
polyethylene oxide (meth)acrylate (i.e. polyethoxylated (meth)acrylic acid),
hydroxyalkylesters of alpha-ethylenically-unsaturated, typically mono-alpha-ethylenically-unsaturated, mono-carboxylic acids, such as 2-hydroxyethylacrylate,
hydroxyalkylamides of alpha-ethylenically-unsaturated, typically mono-alpha-ethylenically-unsaturated, mono-carboxylic acids,
dimethylaminoethyl(meth)acrylate, dimethylaminopropyl(meth)acrylate, ditertiobutylaminoethyl(meth)acrylate, dimethylaminomethyl(meth)acrylamide, dimethylaminopropyl(meth)acrylamide,
ethylenimine, vinylamine, 2-vinylpyridine, 4-vinylpyridine,
trimethylammonium ethyl(meth)acrylate chloride, trimethylammonium ethyl(meth)acrylate methyl sulphate, dimethylammonium ethyl(meth)acrylate benzyl chloride, 4-benzoylbenzyl dimethylammonium ethyl acrylate chloride, trimethyl ammonium ethyl(meth)acrylamido (also called 2-(acryloxy)ethyltrimethylammonium, TMAEAMS) chloride, trimethylammonium ethyl(meth)acrylate (also called 2-(acryloxy)ethyltrimethylammonium, TMAEAMS) methyl sulphate, trimethyl ammonium propyl(meth)acrylamido chloride, vinylbenzyl trimethyl ammonium chloride,
diallyldimethyl ammonium chloride,
ethylene oxide, propylene oxide,
vinyl sulphonic acid, salts of vinyl sulfonic acid,
vinylbenzene sulphonic acid, salts of vinylbenzene sulphonic acid,
alpha-acrylamidomethylpropanesulphonic acid, salts of alpha-acrylamidomethylpropanesulphonic acid,
2-sulphoethyl methacrylate, salts of 2-sulphoethyl methacrylate,
acrylamido-2-methylpropanesulphonic acid (AMPS), salts of acrylamido-2-methylpropanesulphonic acid,
styrenesulphonate (SS),
glycol, glycerol,
aminoalkyl(meth)acrylates, aminoalkyl(meth)acrylamides,
monomers comprising at least one secondary, tertiary or quaternary amine function, or a heterocyclic group containing a nitrogen atom, vinylamine or ethylenimine,
diallyldialkyl ammonium salts, their mixtures, their salts, and macromonomers deriving from therefrom,
dimethylaminoethyl(meth)acrylate, dimethylaminopropyl(meth)acrylate, ditertiobutylaminoethyl(meth)acrylate, dimethylaminomethyl(meth)acrylamide, dimethylaminopropyl(meth)acrylamide, and
ethylenimine, vinylamine, 2-vinylpyridine, 4-vinylpyridine.

In one embodiment, the polymer is any suitable polysaccharide polymer or polysaccharide polymer derivative, typically water soluble or water dispersible ones. Examples of polysaccharide polymers or polysaccharide polymer derivatives include but are not limited to guar gum, guar gum derivatives, cellulose, cellulose derivatives, starch, starch derivatives, locust bean gum, locust bean gum derivatives, Xanthan gum, Xanthan gum derivatives, and other polysaccharide polymers or polysaccharide polymer derivatives, for example other galactomannan polymers or derivative, for example cassia gum or cationic cassia gum or cassia gum derivatives, or tara gum. In another embodiment, the polysaccharide include amylopectin and amylopectin derivatives; lignocellulose; xylan, arabinoxylan, glucans, xyloglucans, and other plant cell wall hemicelluloses; pectin, inulin, konjac gum; welan gum, and succinoglycans, gellan, levan, pullulan, mannan, mellan, dextran; and mixtures thereof.

Cellulose ethers for use in the invention include hydroxyethyl cellulose (HEC), hydroxypropyl cellulose (HPC), water soluble ethylhydroxyethyl cellulose (EHEC), carboxymethyl cellulose (CMC), carboxymethylhydroxyethyl cellulose (CM H EC), hydroxypropylhydroxyethyl cellulose (HPHEC), methyl cellulose (MC), methylhydroxypropyl cellulose (MHPC), methylhydroxyethyl cellulose (MHEC), carboxymethylmethyl cellulose (CMMC), hydrophobically modified carboxymethyl cellulose (HMCMC), hydrophobically modified hydroxyethyl cellulose (HMHEC), hydrophobically modified hydroxypropyl cellulose (HMHPC), hydrophobically modified ethylhydroxyethyl cellulose (HMEHEC), hydrophobically modified carboxymethylhydroxyethyl cellulose (HMCMHEC), hydrophobically modified hydroxypropylhydroxyethyl cellulose (HMHPHEC), hydrophobically modified methyl cellulose (H MMC), hydrophobically modified methylhydroxypropyl cellulose (HMMHPC), hydrophobically modified methylhydroxyethyl cellulose (HMMHEC), hydrophobically modified carboxymethylmethyl cellulose (HMCMMC), cationic hydroxyethyl cellulose (cationic HEC) and cationic hydrophobically modified hydroxyethyl cellulose (cationic HMHEC). Typical cellulose ethers are carboxymethyl cellulose and hydroxyethyl cellulose.

Guar derivatives for use in the invention include carboxymethyl guar (CM guar), hydroxyethyl guar (HE guar), hydroxypropyl guar (HP guar), carboxymethylhydroxypropyl guar (CMHP guar), cationic guar, hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar) and hydrophobically modified cationic guar (HM cationic guar).

Examples that may be mentioned include cationic polysaccharide derivatives, for instance guar or cellulose derivatives. Cationic polymers functionalized with hydrophobic groups optionally containing a hydroxyl group, may be used. These hydrophobic groups are attached to the main polymer chain via ether bonds. In the case of hydrophobic or nonhydrophobic modified cationic guars, the cationic group is a quaternary ammonium group bearing three radicals, which may be identical or different, chosen from hydrogen, an alkyl radical. The counterion is a halogen, for example chlorine.

Among the cationic guar derivatives that may be mentioned are guar hydroxypropyl trimonium chloride (JAGUAR® C13S, C14S, or C17, JAGUAR® Excel and JAGUAR® C 2000 (Rhodia Inc.) or hydroxypropyl guar hydroxypropyl trimonium chloride (JAGUAR® C1621 (Rhodia Inc.). Among the cationic cellulose derivatives that may be used are trimethylammonium-3-propyl cellulose poly (1,2-oxyethanediyl)-2-hydroxy ether chloride or polyquaternium-10, for instance Polymer JR400 (INPI name: PQ10) sold by the company Amerchol. Nonionic polysaccharide derivatives, for example hydroxypropyl guar, may also be used.

In the case of cationic polysaccharide derivatives, the degree of hydroxyalkylation (molar substitution or MS) is typically between 0 and 1.2. Still in the case of these polymers, the degree of cationicity (degree of substitution or DS) is more particularly between 0.01 and 0.6. This is the case, for example, for JAGUAR® C162 and C2000 products (Rhodia, Inc.).

The polymers of the present invention typically have a weight-average molar mass of from 1,000 g/mol to 10,000,000 g/mol, more typically of from about 10,000 g/mol to about 10,000,000 g/mol, depending on their possible and desired degree of polymerization. In one embodiment, the polymers of the present invention have a weight-average molecular weight of 10,000 to 2,000,000 Daltons. In another embodiment, the polymers of the present invention have a weight-average molecular weight of 2,000,000 to 4,000,000 Daltons. In yet another embodiment, the polymers of the present invention have a weight-average molecular weight of 3,000,000 to 7,000,000 Daltons.

The copolymers according to the invention can be obtained by any suitable method, for example by free-radicals polymerization, controlled or not, or by ring-opening polymerization (including anionic or cationic polymerization), or by anionic or cationic polymerization, or by chemical modification of a polymer. Free-radicals polymerizations, referred to as "living" or "controlled" are typical. There are several methods for making block copolymers.

Any of the polymers of the present invention, e.g., polysaccharide and synthetic, can be present in the application fluid from about 0.01% to 20% by weight of the application fluid, more typically from about 0.1% to 10% by weight of the application fluid, and most typically 0.1% to 5% by weight of the application fluid.

Although the biocide is typically THPS, THMP or a THP salt, other biocides can be utilized alone or in combination with THPS, THMP or THP salt including not limited to glutaraldehyde, isothiazolin, a glutaraldehyde/quaternary ammonium compound blend, nitrilopropionamide, bronopol and the like.

pH Buffers

The pH buffer may be acidic, neutral or basic. The pH buffer is generally capable of controlling the pH from about pH 3 to about pH 12. For example, in a composition for use at pH of about 4-5, an acetic acid-based buffer can be used. In a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

Typical pH buffers include, for example, fumaric acid, sulfamic acid, citric acid, adipic acid, acetic acid, and/or other pH buffers, more typically sodium bicarbonate. Suitable amounts of pH buffers, when present, are up to 40 parts, typically up to about 20 parts based on 100 parts guar. In one embodiment, suitable amounts of the pH buffer, when present, are 0.1 to 10 parts based on 100 parts guar.

Thiosulfate

In one embodiment, a thiosulfate ($S_2O_3^{2-}$) or thiosulfate compound is added. The cationic counterion of the thiosulfate is typically a sodium cation but may alternatively be a potassium, barium, lithium, calcium, magnesium, ammonium cation, or an alkyl ammonium anion.

Typically, the thiosulfate compound includes but is not limited to ammonium thiosulfate (($NH_4$)$_2S_2O_3$), barium thiosulfate ($BaS_2O_3$), calcium thiosulfate ($CaS_2O_3$), gold(I) sodium thiosulfate dehydrate ($AuNa_3(S_2O_3)$), potassium thiosulfate ($K_2S_2O_3$) and sodium thiosulfate ($Na_2S_2O_3$).

Crosslinkers

The crosslinking agents utilized in the present invention include but are not limited to copper compounds, magnesium compounds, borax, glyoxal, zirconium compounds, titanium compounds (for example, titanium IV compounds such as titanium lactate, titanium malate, titanium citrate, titanium ammonium lactate, polyhydroxy complexes of titanium, titanium triethanolamine, and titanium acetylacetonate), calcium compounds, aluminum compounds (such as, for example, aluminum lactate or aluminum citrate), p-benzoquinone, dicarboxylic acids and their salts, phosphite compounds and phosphate compounds. In another embodiment, the crosslinking agent is a chemical compound containing a polyvalent ion such as, but not necessarily limited to, boron or a metal such as chromium, iron, aluminum, titanium, antimony and zirconium, or mixtures of polyvalent ions In one embodiment, the crosslinking agent is borax. In another embodiment, the crosslinking agent is a zirconium compound. Zirconium compounds can include but are not limited to zirconium acetyl acetonate, zirconium triisopropylamine, zirconium triisopropylamine lactate, zirconium diisopropylamine, zirconium diisopropylamine lactateis and zirconium (IV) compounds such as zirconium lactate, zirconium lactate triethanolamine, zirconium carbonate, zirconium acetylacetonate, zirconium malate, zirconium citrate, and polyhydroxy complexes of zirconium.

In one embodiment, the polymer (typically in the aqueous polymer composition) can be crosslinked with a crosslinking agent, which results in an increase of viscosity of the fluid typically greater than 50 cP, more typically, greater than about 100 cP, and even more typically greater than 200 cP (@ 100/sec at the formation temperature). In some embodiments, the resulting viscosity is greater than about 200 cP. The crosslinking agent is typically a zirconium compound or a borax compound, but can be any suitable crosslinking Other Additives Well stimulation and completion (treatment) fluid compositions of the present disclosure can further comprise other additives. Additives are generally included to enhance the stability of the fluid composition itself to prevent breakdown caused by exposure to oxygen, temperature change, trace metals, constituents of water added to the fluid composition, and to prevent non-optimal crosslinking reaction kinetics. The choice of components used in fluid compositions is dictated to a large extent by the properties of the hydrocarbon-bearing formation on which they are to be used. Such additives can be selected from the group consisting of water, oils, salts (including organic salts), crosslinkers, polymers, biocides, corrosion inhibitors and dissolvers, pH modifiers (e.g., acids and bases), breakers, oxidizers, metal chelators, metal complexors, antioxidants, wetting agents, polymer stabilizers, clay stabilizers, scale inhibitors and dissolvers, wax inhibitors and dissolvers, asphaltene precipitation inhibitors, water flow inhibitors, fluid loss additives, chemical grouts, diverters, sand consolidation chemicals, proppants, permeability modifiers, viscoelastic fluids, gases (e.g., nitrogen and carbon dioxide), and foaming agents.

In one embodiment, the method of the present invention includes adding a breaker or oxidizer such as perborate, peroxide, persulfate, enzymes, and the like.

The fluids of the present invention include, but are not necessarily limited to, oilfield fluids such as, for example, well servicing fluids, drilling fluids, slickwater fracturing fluids, fracturing fluids, fracturing gels, completion fluids, hole abandonment fluids, and the like, as well as water injection systems and the like.

In one embodiment, the present invention is a method capable of controlling the depolymerization of a polymer without the need for harsh and/or environmentally unfriendly additives such as strong acids, strong alkalis or strong oxidizers.

In one embodiment, any polymer of the present invention can be depolymerized by contacting the polymer with an effective amount of THMP, THPS or THP salt. The polymer can optionally be mixed in water or other fluid composition. In one embodiment, the amount of THPS or THP salt effective to depolymerize the polymer is greater than about 15 parts per million (ppm). In another embodiment, the effective amount of THPS or THP salt is greater than about 20 ppm. In another embodiment, the effective amount of THPS or THP salt is greater than about 25 ppm. In another embodiment, the effective amount of THPS or THP salt is greater than about 35 ppm. In another embodiment, the effective amount of THPS or THP salt is greater than about 100 ppm. In another embodiment, the effective amount of THPS or THP salt is greater than about 250 ppm. In another embodiment, the effective amount of THPS or THP salt is greater than about 500 ppm, while in another embodiment, the effective amount of THPS or THP salt is greater than about 1000 ppm, while in another embodiment, the effective amount of THPS or THP salt is greater than about 1100 ppm, while in other embodiments the amount of THPS or THP salt effective to depolymerized guar is greater than about 10,000 ppm THPS or THP salt. The polymer can be in a dry form, semi-dry form (about 0.1% to about 50% water) or in an aqueous mixture. In one embodiment, the semi-dry form is from about 0.1% to about 15% water. In another embodiment, the semi-dry form is from about 0.1% to about 13% water. In another embodiment, the semi-dry form is from about 0.1% to about 10% water. In yet another embodiment, the semi-dry form is from about 0.1% to about 7% water. In another embodiment, the semi-dry form is from about 0.1% to about 5% water.

The methods of the present invention can control the rate of depolymerization of a polymer, for example a synthetic polymer such as polyacrylamide or a natural polymer such as derivatized guar, in an aqueous composition. First, a mixture of THPS and water is prepared. The mixture typically has an amount of tetrakis(hydroxymethyl)phosphonium sulfate (THPS) greater than about 20 ppm or 25 ppm. Controlling the pH of the THPS-water mixture is accomplished by adding an amount of pH buffer to increase or decrease the pH to a desired pH.

Typically, the pH buffer is fumaric acid, sulfamic acid, citric acid, adipic acid, acetic acid, and/or other pH buffers, and more typically sodium bicarbonate. Suitable amounts of pH buffers can be up to 40 parts or up to about 20 parts based on 100 parts polymer, depending on the desired pH of the THPS-mixture (or as described below, aqueous polymer composition such as fracturing fluids). In one embodiment, suitable amounts of the pH buffer, when present, are 0.1 to 10 parts based on 100 parts polymer.

The THPS-water mixture is then contacted with a polymer, for example a synthetic polymer such as polyacrylamide or a natural polymer such as derivatized guar, by adding the polymer to the mixture or adding the mixture to the polymer. The polymer can be substantially dry or dispersed in an aqueous solution. This forms an aqueous polymer composition, which is typically an application fluid such as a fracturing fluid. The pH of the application fluid can be maintained by adding one or more pH buffers to the fluid.

The slow degradation of a polymer at neutral or higher pH can be utilized to slowly degrade the polymer over a long period of time. This is especially useful in applications such as fracturing in oilfield, where the high viscosity is desired for a certain period of time and then the viscosity needs to be reduced.

Specifically, this method includes a) obtaining a THPS-water mixture having an amount of tetrakis(hydroxymethyl) phosphonium sulfate (THPS) greater than about 20 ppm; b) controlling or adjusting the pH of the THPS-water mixture; and c) contacting the resulting mixture with a polymer to form an aqueous polymer composition. In one embodiment, the aqueous polymer composition is at or greater than a first viscosity for a predetermined time, and after such predetermined period of time is at or lower than the first viscosity. The step of controlling the pH of the THPS-water mixture generally comprises contacting a predetermined amount of a pH buffer to the THPS-water mixture. The pH buffer can be selected from any suitable buffer, including but not limited to amines, alkali metal glycerophosphates, alkali metal orthophosphates, alkali metal hydroxides, carbonates, alkanolamines, silicates, citrates, acetates, phosphates, a triethanolamine, diethanolamine or monoethanolamine, fumaric acid, sulfamic acid, citric acid, adipic acid, acetic acid, sodium carbonate, or sodium bicarbonate and mixtures thereof. In one embodiment, the THP salt is THPS.

In another embodiment, the present invention is a method of controlling the rate of depolymerization of a polymer in an aqueous composition comprising a) obtaining a THP salt-water mixture having an amount of THP salt greater than about 20 ppm; b) contacting the mixture with a polymer to form an aqueous polymer composition and c) adjusting the pH of the aqueous polymer composition. In one embodiment, step (c) comprises contacting a predetermined amount of a pH buffer to the aqueous polymer composition. The rate of depolymerization of the polymer is inversely proportional to the pH of the aqueous polymer composition. As the pH of the aqueous polymer composition increases, the rate of depolymerization decreases. The pH buffer can be selected from any suitable buffer, including but not limited to fumaric acid, sulfamic acid, citric acid, adipic acid, acetic acid or sodium bicarbonate, or a mixture thereof. In one embodiment, the THP salt is THPS.

In yet another embodiment, the present invention is a method of controlling the rate of depolymerization of polymer in an aqueous mixture comprising: obtaining a THP salt-water mixture having an amount of THP salt greater than about 20 ppm, typically, greater than about 100 ppm; contacting a pH buffer to the THP salt-water mixture to form a resulting mixture having a pH of greater than about 6 or 7; contacting the resulting mixture with a polymer to form an aqueous polymer composition. In one embodiment, the aqueous polymer composition can be crosslinked with a crosslinking agent, the resulting viscosity is typically greater than 50 cP, more typically, about 100 cP. In some embodiments, the resulting viscosity is greater than about 200 cP. Typically, the aqueous polymer composition is a fracturing fluid.

In yet another embodiment, the present invention is a method of controlling the rate of depolymerization of a polymer in an aqueous polysaccharide composition comprising: a) obtaining a THPS-water mixture having an amount of THPS greater than about 20 ppm; b) adjusting the pH of the THPS-water mixture; and c) contacting the resulting mixture with a polymer to form an aqueous polymer composition, whereby the aqueous polymer composition is at or greater than a first viscosity for a predetermined time, and after such predetermined period of time is at or lower than the first viscosity. The step controlling the pH of the THPS-water mixture generally comprises contacting a predetermined amount of a pH buffer to the THPS-water mixture.

In one embodiment, to use THPS as a biocide to treat water without rapidly losing the viscosity of the polysaccharide solution, controlling depolymerization of the polymer, for example, polysaccharide, typically, guar or a guar derivative, can be generally accomplished in 2 ways.

Method #1: Method without use of sodium thiosulfate:
1) Treat water with appropriate levels of THPS to decrease bacterial count;
2) Adjust pH of water to maintain above pH 6 or pH 7, and then
3) Add polysaccharide solution and maintain pH above 6, more typically 7.

Method #2: Method with sodium thiosulfate
1) Treat water with appropriate levels of THPS to decrease bacterial count,
2) Add sodium thiosulfate, and
3) Add polysaccharide solution.

Through method #2, once sodium thiosulfate is added, the polysaccharide can then be added and viscosity loss can be prevented irrespective of the pH, which will be described in greater detail below.

In one embodiment, the method prevents the THPS in the application fluid from substantially depolymerizing the polymer, for example, polysaccharide such as a guar. The first step is obtaining a THPS-water mixture having an amount of tetrakis(hydroxymethyl)phosphonium sulfate (THPS) greater than about 20 ppm or 25 ppm. Then a pH buffer is contacted with the THPS-water mixture to form a resulting mixture having a pH of greater than about 6. In some embodiments the resulting mixture having a pH of greater than about 7. Then the resulting mixture having a pH of greater than about 6 or 7 is contacted with a polysaccharide (in dry or in solution) to form an aqueous polymer composition, e.g., application fluid. The viscosity of the application fluid is greater than the viscosity of water, typically greater than about 2 cP, or 5 cP. In other embodiments, the viscosity of the application fluid is greater than about 10 cP, or cP or greater than about 24 cP (@511/sec shear).

In one embodiment, the polymer in an aqueous polymer composition is then crosslinked with a crosslinking agent, which results in an increase of viscosity of the fluid typically greater than 50 cP, more typically, greater than about 100 cP, and even more typically greater than 200 cP (@100/sec at the formation temperature). In some embodiments, the resulting viscosity is greater than about 200 cP. The crosslinking agent is typically a zirconium compound or a borax compound, but can be any suitable crosslinking agent.

In comparative tests using 100 ppm of THPS in water, where the pH buffer was added only after the THPS-water mixture was contacted with the guar, the crosslink viscosity was less than about 50 cP (after 30 mins).

Aside from sodium thiosulfate, other oxygen scavenger/reducing agent that can be utilized include but are not limited to sodium bisulfite, sodium metabisulfite, sodium sulfite, potassium bisulfite, potassium metabisulfite etc.

It has also been shown that THPS can be used as a biocide in fracturing applications at any pH by use of certain steps in the making of the fracturing fluid, which includes adding THPS to water to destroy bacteria in the water, then adding an oxygen scavenger/reducing agent (such as sodium thiosulfate) to the resulting THPS-water mixture, which is followed by contacting the polysaccharide with the mixture of THPS-water and oxygen scavenger/reducing agent (e.g., sodium thiosulfate). It is also understood than other variations to the above steps can be utilized—the oxygen scavenger/reducing agent can be contacted with (e.g., addition to) the water prior to the water contacting with THPS—so long as the resulting mixture of THPS-water and oxygen scavenger/reducing agent (e.g., sodium thiosulfate) is created prior to contacting with the polymer such as polysaccharide.

Specifically, a method of the present invention comprises a) obtaining a THPS-water mixture having an amount of tetrakis(hydroxymethyl)phosphonium sulfate (THPS) greater than about 20 ppm or 25 ppm; b) contacting an effective amount of a thiosulfate compound with the THPS-water mixture to form a resulting mixture; and c) contacting the resulting mixture with a polymer such as a polysaccharide to form an aqueous polymer composition, whereby the viscosity of the aqueous polymer composition is greater than about 10 cP, or greater than 15 cP, or greater than 24 cP. The thiosulfate compound can be ammonium thiosulfate, barium thiosulfate, calcium thiosulfate, potassium thiosulfate and sodium thiosulfate.

In one embodiment, the polymer in the aqueous polymer composition is then crosslinked with a crosslinking agent, which results in an increase of viscosity of the fluid typically greater than about 100 cP, and typically greater than 200 cP (after 30 minutes at 200° F.). The crosslinking agent is typically a zirconium compound or a borax compound, but can be any suitable crosslinking agent.

In another embodiment, the method includes a) obtaining a THPS-water mixture having an amount of tetrakis(hydroxymethyl)phosphonium sulfate (THPS) greater than about 20 ppm; b) controlling the pH of the THPS-water mixture; and c) contacting the resulting mixture with a polysaccharide to form an aqueous polysaccharide composition. By controlling (through adjusting) the pH of the THPS-water mixture or aqueous polysaccharide composition, e.g., application fluid, the initial viscosity of the application fluid can be maintained or remain substantially constant for a given period of time. Generally, this period of time is from 0.1 to 48 hours, typically 1 to 24 hours and more typically 2 to 4 hours. In another embodiment, this period of time is from 0.1 to 72 hours. After this period of time, the viscosity of the application fluid substantially decreases to less than about 85% of the initial viscosity, or, in some embodiments, less than about 75% of the initial viscosity, or, in some embodiments, less than about 65% of the initial viscosity, or, in some embodiments, less than about 50% of the initial viscosity or, in some embodiments, less than about 35% of the initial viscosity or, in some embodiments, less than about 30% of the initial viscosity or, in other embodiments, less than about 25% of the initial viscosity.

EXAMPLES

Example A

Depolymerization of Natural Polymers 980 gm of water was mixed with 20 gm of potassium chloride. To the solution 4.8 gm of guar gum (Higum 1122) was added and allowed to hydrate. The hydrated solution was split in to different containers and different levels of Tolcide 20A (containing 20% THPS) were added. A total of six samples were made as shown in the following examples. The viscosity and pH of the samples about 15 minutes and 24 hours after adding the Tolcide 20A is shown in Table 1. The viscosity was measured in an OFITE viscometer, model 900 at different rpm from 600 rpm to 3 rpm. The active THPS level is listed in the examples.

Example 1

Control, no THPS without any pH adjustment.

Example 2

Control, no THPS with pH adjusted to 3.6

Example 3

25 ppm THPS, pH 5.6

Example 4

25 ppm THPS, pH adjusted to 3.6

Example 5

100 ppm THPS, pH 4.02

Example 6

500 ppm THPS, pH 3.6

TABLE 1

Viscosity of guar solutions with different levels of THPS
Viscosity in cP at room temperature(~75 F.) using OFITE model viscometer, R1B1
bob(Shear rate(sec^−1) = 1.7* rpm)

| | Example 1 | Example 2 | Example 3 ~15 min | Example 3 24 hr | Example 4 15 min | Example 4 24 hours | Example 5 ~15 min | Example 6 ~ 15 min |
|---|---|---|---|---|---|---|---|---|
| Description | Control, no THPS, pH 6.7 | control, no THPS, pH 3.6 with HCl | 25 ppm THPS, pH 5.6, after 15 minutes | 25 ppm THPS, pH 5.6, after 24 hours | 25 ppm THPS, pH 3.6 using HCL, after 15 minutes | 25 ppm THPS, pH 3.6 using HCL, after 24 hours | 100 ppm THPS, pH 4.02 @ 15 minutes | 500 ppm THPS, pH 3.6, after 15 minutes |
| Speed (rpm) | | | | | | | | |
| 600 | 30 | 29.5 | 29.7 | 28.6 | 29.1 | 22.5 | 6.9 | 4.9 |
| 300 | 47.9 | 46.8 | 47.1 | 44.8 | 46 | 31.7 | 7 | 5.1 |
| 100 | 97.9 | 93.8 | 96.8 | 87.1 | 93.8 | 50.8 | 5.6 | 4.9 |
| 60 | 136.5 | 130.4 | 134.8 | 117.4 | 130.4 | 59.6 | 7.1 | |
| 30 | 214.3 | 203.2 | 208.9 | 173.9 | 203.2 | 73.2 | 7.3 | |
| 6 | 540 | 503.9 | 501 | 361 | 503.9 | 89.7 | | |
| 3 | 776.5 | | 657 | 477 | 658 | 113.2 | | |

As can be seen, with increasing THPS levels, the viscosity of the solution decreases. As can be seen, with increasing levels of THPS, the pH also decreases. However, Example 2 at pH 3.6 without THPS does not show any significant decrease in viscosity whereas example 5 and 6 with 100 and 500 ppm THPS shows significant decrease in viscosity. This indicates that the viscosity decreases at acid pHs only in the presence of THPS.

Since, with increasing levels of THPS, the pH also decreases, in the next series of tests, sodium bicarbonate is added as a buffer to maintain a higher pH. The steps are as follows:

Step 1: Add Tolcide 70A (70% active THPS) to DI water containing 2% KCl

Step 2: Add 600 ppm sodium bicarbonate

Step 3: Add 0.36% (30 lb/1000 gal) guar gum (Higum 1122) and allow to hydrate for 30 minutes

TABLE 2

Viscosity of guar solution buffered with
sodium bicarbonate with and without THPS

| | | Step 1 & Step 2 | Step 3 (after guar addition) | |
|---|---|---|---|---|
| | | pH (after adding THPS and bicarbonate) | pH after adding guar | Viscosity, cP @ 511/sec |
| Example 7 | 600 ppm bicarbonate + 0 ppm THPS | | 8.2 | 27 cP |
| Example 8 | 600 ppm bicarbonate + 250 ppm THPS | 7.1 | 7.1 | 27 cP |

From example 7 and 8, if the pH is maintained around 7, there is no decrease in the viscosity of the guar solution.

In the next series of tests, the order of addition is tested by adding the Tolcide 70A (70% THPS active) and guar first, allowing the pH to decrease depending on the level of Tolcide 70A and then adding sodium bicarbonate to increase the pH and see whether the viscosity loss is recovered. The examples are listed based on active THPS present.

The solutions were prepared as follows:

Step 1: Add THPS to DI water containing 2% KCl

Step 2: Add 0.36% (30 lb/1000 gal) guar (Higum 1122) to THPS-water and allow to hydrate for 30 minutes Step 3: Add 600 ppm sodium bicarbonate to increase pH of the guar solution containing THPS

TABLE 3

Viscosity for guar solution where THPS and guar are added first
Viscosity for guar solution where THPS and guar are added first

|  | Step 1 | pH (after THPS) | Step 2 pH (after adding guar) | Viscosity, cP @ 511/sec | Step 3 pH after bicarbonate | Viscosity, cP after bicarbonate addition |
|---|---|---|---|---|---|---|
| Example 9 | 25 ppm THPS | 4.36 | 5.2 | 24 | 8.2 | 24 |
| Example 10 | 50 ppm THPS | 4.1 | 4.4 | 6-7 cP | 7.8 | 6-7 cP |
| Example 11 | 100 ppm THPS | 3.9 | 4.1 | 6-7 cP | 7.6 | 6-7 cP |
| Example 12 | 250 ppm THPS | 3.6 | 3.7 | 3 cP | 7.2 | 3-4 cP |

Example 9-12 indicates that there is a dramatic loss in viscosity when the amount of THPS is greater than 50 ppm. Also, when >50 ppm THPS is present, the pH of the guar solutions is <pH 5. When sodium bicarbonate is added, the pH increases to about 8 but there is no recovery in the viscosity. This indicates that if the pH is low in the presence of guar, viscosity loss occurs and it cannot be recovered by increasing the pH.

Examples Relating to Crosslinking with Borax

Example 13 to 16 are examples of guar solutions crosslinked with borax to form a crosslinked gel and tested at 200 F in a Brookfield TTPVS (high pressure, high temperature viscometer).

Example 13

204 gram of solution from example 7 at pH 8.2 with a viscosity of 27 cP@511/sec is taken in a blender. While mixing, 0.8 ml of high pH buffer (25% wt. potassium carbonate solution) was used to adjust the pH to 10.1. Then 0.3 ml of borax crosslinker (25% wt borax in ethylene glycol) is added. The pH of the sample after adding borax crosslinker is 9.8. Then about 45 grams of the sample is transferred to the Brookfield viscometer cup. The viscometer is pressurized to about 300-400 psi and then tested at 200 F. The viscosity of the crosslinked gel as a function of time in monitored and reported in Table 4.

TABLE 4

Viscosity profile as a function of time for example 13

| | Time (minutes) | | | | | | | |
|---|---|---|---|---|---|---|---|---|
| | 0 min | 3 min | 5 min | 10 min | 30 min | 60 min | 90 min | 120 min |
| Viscosity, cP @ 100/sec | 375 | 200 | 250 | 320 | 356 | 322 | 400 | 385 |
| T (F.) | 72 F. | 72 F. | 150 F. | 200 F. | 200 F. | 200 F. | 200 F. | 200 F. |

Example 14

204 gram of solution from example 8 with 250 ppm THPS at pH 7.1 with a viscosity of 27 cP@511/sec is taken in a blender. While mixing, 0.8 ml of high pH buffer (25% wt. potassium carbonate solution) was used to adjust the pH to 10.1. Then borax 0.4 ml of crosslinker (25% wt borax in ethylene glycol) is added. The pH of the sample after adding the borax crosslinker is 9.8. Then about 45 grams of the sample is transferred to the Brookfield viscometer cup. The viscometer is pressurized to about 300-400 psi and then tested at 200 F. The viscosity of the crosslinked gel as a function of time in monitored and reported in Table 5.

TABLE 5

Viscosity profile as a function of time for example 14

| | Time (minutes) | | | | | | | |
|---|---|---|---|---|---|---|---|---|
| | 0 min | 3 min | 5 min | 10 min | 30 min | 60 min | 90 min | 120 min |
| Viscosity, cP @ 100/sec | 600 | 200 | 190 | 285 | 396 | 325 | 380 | 350 |
| T (F.) | 72 F. | 72 F. | 136 F. | 192 F. | 200 F. | 200 F. | 200 F. | 200 F. |

The viscosity of example 14 with 250 ppm THPS are comparable to the example 13, control sample without any THPS.

Example 15

204 gram of solution from example 9 containing 25 ppm THPS at pH 8.2 with a viscosity of 24 cP@511/sec is taken in a blender. While mixing, 0.8 ml of high pH buffer (25% wt. potassium carbonate solution) was used to adjust the pH to 10.1. Then 0.4 ml of borax crosslinker (25% wt borax in ethylene glycol) is added. The pH of the sample after adding borax is 9.8. Then about 45 grams of the sample is transferred to the Brookfield viscometer cup. The viscometer is pressurized to about 300-400 psi and then tested at 200 F. The viscosity of the crosslinked gel as a function of time in monitored and reported in Table 6a.

TABLE 6a

Viscosity profile as a function of time for example 15

| | Time (minutes) | | | | | | | |
|---|---|---|---|---|---|---|---|---|
| | 0 min | 3 min | 5 min | 10 min | 30 min | 60 min | 90 min | 120 min |
| Viscosity, cP @ 100/sec | 670 | 300 | 200 | 246 | 175 | 215 | 267 | |
| T (F.) | 72 F. | 72 F. | 154 F. | 194 F. | 200 F. | 200 F. | 200 F. | |

The viscosity of example 15 is slightly lower than the control sample, example 13. The solution viscosity before crosslinking in this example 15 is about 24 cP which is slightly lower than the solution viscosity of 27 cP in example 13, control sample without THPS.

Example 16

204 gram of solution from example 11 containing 100 ppm THPS at pH 7.6 with a viscosity of 6-7 cP@511/sec is taken in a blender. While mixing, 0.8 ml of high pH buffer (25% wt. potassium carbonate solution) was used to adjust the pH to 10.1. Then 0.4 ml of borax crosslinker (25% wt borax in ethylene glycol) is added. The pH of the sample after adding borax crosslinker is 9.7. Then about 45 grams of the sample is transferred to the Brookfield viscometer cup. The viscometer is pressurized to about 300-400 psi and then tested at 200 F. The viscosity of the crosslinked gel as a function of time in monitored and reported in Table 6b.

TABLE 6b

Viscosity profile as a function of time for example 16

| | Time (minutes) | | | | | | | |
|---|---|---|---|---|---|---|---|---|
| | 0 min | 3 min | 5 min | 10 min | 30 min | 60 min | 90 min | 120 min |
| Viscosity, cP @ 100/sec | 700 | 150 | <10 | <10 | <10 | <10 | <10 | |
| T (F.) | 75 F. | 75 F. | 137 F. | 195 F. | 200 F. | 200 F. | 200 F. | |

The viscosity of example 16 is significantly lower than example 13, control sample without THPS. The solution viscosity before crosslinking in this example 16 is about 6-7 cP which is considerably lower than the solution viscosity of 27 cP in example 13, control sample without THPS.

Referring to FIG. 1, the graphs illustrate the effect of THPS on Guar-Borax crosslinking with varying amounts of THPS and with varying the timing of buffer addition. The viscosity is monitored with time at 100/sec shear. At 30 min, 60 min, 90 and 120 min, a shear ramp is performed. At these times, the shear rate is varied from 100/sec to 75 to 50 to 25 and again back to 100/sec. The change in the shear rates results in a corresponding change in the viscosity which appears as spikes.

Figure 2:
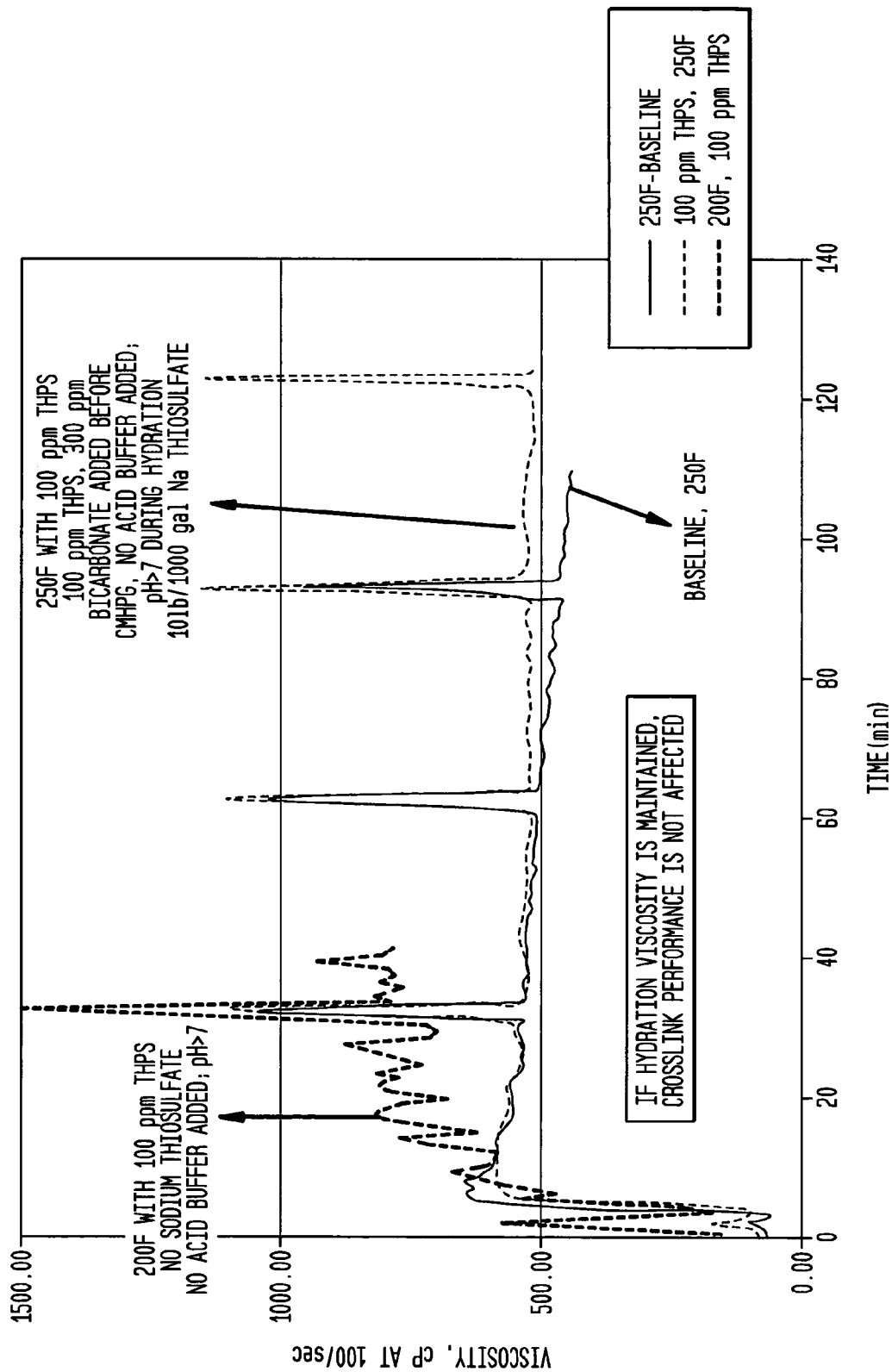
FIG. 2 is a graph illustrating the effect of THPS on Guar-Zirconium crosslinking.

Examples 13-16 indicate that if the guar solution viscosity before crosslinking is maintained, there is no impact due to the presence of THPS. The viscosity results from example 13-16 is plotted in FIG. 2 as a function of time.

Crosslinking CMHPG with Zirconium Crosslinkers

Examples 17 and 18 show crosslinking of carboxymethyl guar (CMHPG) using zirconium crosslinkers with and without THPS.

Example 17

(CMHPG JAGUAR® 418) is hydrated and crosslinked with zirconium crosslinker, Tyzor 212 as follows:
1) Take DI water and add 0.1% tetramethyl ammonium chloride
2) Add 300 ppm sodium bicarbonate
3) While mixing, add 0.48% wt (CMHPG JAGUAR® 418)
4) Allow to hydrate for 30 minutes Take 200 gm of the solution in a blender. While mixing, add 0.24 gm of sodium thiosulfate and adjust the pH to 10 using 0.25 ml of 25% potassium carbonate solution. Then add 0.2 ml of zirconium crosslinker, (25% wt Tyzor 212 in IPA).

Transfer 45 gm to the Brookfield viscometer cup, pressurize to 300-400 psi and then tested at 250 F. It takes about 10 minutes for the sample to reach the test temperature. The viscosity of the crosslinked gel in monitored as a function of time in Table 7

TABLE 7

Viscosity profile as a function of time for example 17

| | Time (minutes) | | | | | | | |
|---|---|---|---|---|---|---|---|---|
| | 0 min | 3 min | 5 min | 10 min | 30 min | 60 min | 90 min | 105 min |
| Viscosity, cP @ 100/sec | 63 | 53 | 650 | 593 | 540 | 510 | 460 | 450 |
| T (F.) | 70 F. | 83 F. | 190 F. | 250 F. | 250 F. | 250 F. | 250 F. | 250 F. |

Example 18

(CMHPG JAGUAR® 418) is hydrated with 100 ppm THPS and crosslinked with zirconium crosslinker, Tyzor 212 as follows:

1) Take DI water and add 0.1% tetramethyl ammonium chloride
2) Add Tolcide 70A (70% THPS) to make 100 ppm THPS solution
3) Add 300 ppm sodium bicarbonate. Measured pH is 7.1
4) While mixing, add 0.48% wt (CMHPG JAGUAR® 418)
5) Allow to hydrate for 30 minutes and measured pH to be 8.3 and viscosity is 35.7 cP@511/sec, 75 F.

Take 200 gm of the solution in a blender. While mixing, add 0.24 gm of sodium thiosulfate and adjust the pH to 9.9 using 0.25 ml of 25% potassium carbonate solution. Then add 0.2 ml of zirconium crosslinker, (25% wt. Tyzor 212 in IPA). Transfer 45 gm to the Brookfield viscometer cup, pressurize to 300-400 psi and then tested at 250 F. It takes about 10 minutes for the sample to reach the test temperature. The viscosity of the crosslinked gel in monitored as a function of time in Table 8.

TABLE 8

Viscosity profile as a function of time for example 18

| | Time (minutes) | | | | | | | |
|---|---|---|---|---|---|---|---|---|
| | 0 min | 3 min | 5 min | 10 min | 30 min | 60 min | 90 min | 120 min |
| Viscosity, cP @ 100/sec | 76 | 70 | 522 | 585 | 545 | 525 | 520 | 520 |
| T (F.) | 77 F. | 87 F. | 145 F. | 242 F. | 250 F. | 250 F. | 250 F. | 250 F. |

This shows that by maintaining the pH around neutral when CMHPG and THPS are present, there is no impact on the crosslinked viscosity by adding THPS.

Examples Relating to the Effect of Sodium Thiosulfate

The next set of examples 19-22 shows the effect of sodium thiosulfate in helping maintain the viscosity of (CMHPG JAGUAR® 418) solutions. The steps are as follows:

Add sodium bicarbonate and Tolcide 70A (70% THPS) to water. Then add (CMHPG JAGUAR® 418) and allow about 30 minutes to hydrate. Measure viscosity and pH. Then lower the pH to about 4 with 0.12% sodium thiosulfate or without thiosulfate and measure viscosity.

TABLE 9

Effect of sodium thiosulfate on the Viscosity of CMHPG with THPS at low pH

Effect of sodium thiosulfate on the Viscosity of CMHPG with THPS at low pH

| | Water | Step 1: Add CMHPG | pH | Visc, cP @ 511/sec | Step 2: lower pH with or without thiosulfate | pH | Visc, cP @ 511/sec |
|---|---|---|---|---|---|---|---|
| Example 19 | 600 ppm bicarbonate, 100 ppm THPS | Add CMHPG | 7.8 | 27 cP | Lower pH, no thiosulfate | pH 4 | 13.2 cP |
| Example 20 | 600 ppm bicarbonate, 250 ppm THPS | Add CMHPG | pH 7.5 | 27.2 cP | Lower pH, no thiosulfate | pH 3.9 | 4.1 cP |
| Example 21 | 600 ppm bicarbonate, 100 ppm THPS | Add CMHPG | pH 8 | 27.9 cP | Add thiosulfate, then lower pH | pH 3.9 | 27.2 cP |

TABLE 9-continued

Effect of sodium thiosulfate on the Viscosity of CMHPG with THPS at low pH
Effect of sodium thiosulfate on the Viscosity of CMHPG with THPS at low pH

|  | Water | Step 1: Add CMHPG | pH | Visc, cP @ 511/sec | Step 2: lower pH with or without thiosulfate | pH | Visc, cP @ 511/sec |
|---|---|---|---|---|---|---|---|
| Example 22 | 600 ppm bicarbonate, 250 ppm THPS | Add CMHPG | pH 7.6 | 27.2 cP | Add thiosulfate, then lower pH | pH 3.9 | 27.2 cP |

Examples 19-22 indicate that in the absence of sodium thiosulfate, there is a drastic decrease in the viscosity of the solution with THPS when the pH is decreased. In the presence of sodium thiosulfate, there is no change in the viscosity of the solutions with THPS when the pH is decreased. This indicates that if we need to decrease the pH of the guar solution with THPS, adding sodium thiosulfate before decreasing the pH will help in preventing the viscosity loss.

In the next set of experiments, higher levels of Tolcide 70A (70% THPS active) are used and the viscosity is monitored a period of several days. The steps involved are as follows:
Step 1: Add Tolcide 70A (70% active THPS) to DI water containing 2% KCl
Step 2: Add 600 ppm sodium bicarbonate
Step 3: Add 0.36% (30 lb/1000 gal) guar gum (Higum 1122) and allow to hydrate for 30 minutes

TABLE 10

Viscosity of guar solution buffered with sodium bicarbonate with different levels of THPS
Viscosity of guar solution buffered with sodium bicarbonate with different levels of THPS

|  |  | Step 1 & Step 2 | Step 3 (after guar addition) | | |
|---|---|---|---|---|---|
|  |  | pH (after adding THPS and bicarbonate) | pH after adding guar | Viscosity, cP @ 511/sec, 30 minutes | Viscosity, cP @ 511/sec, 1 day | Viscosity, cP @ 511/sec, 4 days |
| Example 23 | 600 ppm bicarbonate + 100 ppm THPS | 7.5 | 7.8 | 27.4 cP | 26.1 cP | 23.5 cP |
| Example 24 | 600 ppm bicarbonate + 500 ppm THPS | 6.8 | 7.3 | 25.3 cP | 22.9 cP | 20 cP |
| Example 25 | 600 ppm bicarbonate + 1000 ppm THPS | 6.2 | 6.3 | 21 cP | 9.6 cP | 4.3 cP |

These examples 23-25 indicate that between a pH range of 6 and 8, the viscosity is maintained at a constant or substantially constant level over several days. In example 23, the viscosity was maintained at a substantially constant viscosity of above 95% of initial viscosity (measured after 30 minutes) after 1 day, and of above 85% of initial viscosity after 4 days.

Based on these examples, depolymerization of/decrease in the viscosity of polysaccharide solutions can be achieved by adding THPS. The rate at which viscosity decreases is a function of the amount of THPS and pH. Lowering the pH, results in viscosity loss. By adjusting the pH, the depolymerization can be done in a controlled or slow manner that could be used such that the viscosity is stable initially and then could decrease over the long term. This is useful for applications in oilfield fracturing where the viscosity needs to be maintained initially and then slowly decreased over a period of time for good cleanup.

Example B

Depolymerization of Water Soluble Synthetic Polymers

The following examples demonstrate the ability of THPS to depolymerize polyacrylamide and copolymers of polyacrylamide.

Example 1B

A 1% solution of Alkafloc EA-173H, a copolymer of acrylamide and acrylic acid is made as follows: To 784 gm of deionized water, 16 gm of potassium chloride is added. Then 8 gm of alkafloc EA-173H is added and stirred for about an hour to build viscosity. The solution was divided into 4 parts and different levels of THPS were added (no THPS, 50 ppm THPS, 100 ppm and 500 ppm THPS) and the viscosity and pH measured. The viscosity was measured in an OFITE model 900 viscometer at 300 rpm (511/sec) using R1B1 geometry.

TABLE 1B

| | Viscosity of 1% Alkafloc EA-173H @ 511/sec, 75 F. | | | |
|---|---|---|---|---|
| Time (minutes) | No THPS | 50 ppm THPS | 100 ppm THPS | 500 ppm THPS |
| 0 | 21.3 cP | 21.3 | 21.3 cP | 21.3 cP |
| 1 | | 19.9 | 19.5 | 6.6 |
| 2 | | 19.9 | 19.4 | 5.5 |
| 3 | | 20.1 | 19 | 4.4 |
| 5 | | 20 | 18.6 | 3.9 |
| 15 | | 18.8 | 14 | 3.3 |
| 30 | | 18.2 | 15.6 | 3.0 |
| 60 | 21.3 cP | 18.6 | 13.7 | 2.9 |
| pH(@60 minutes) | 7.6 | 6.83 | 6.5 | 5.4 |

Figure 3:
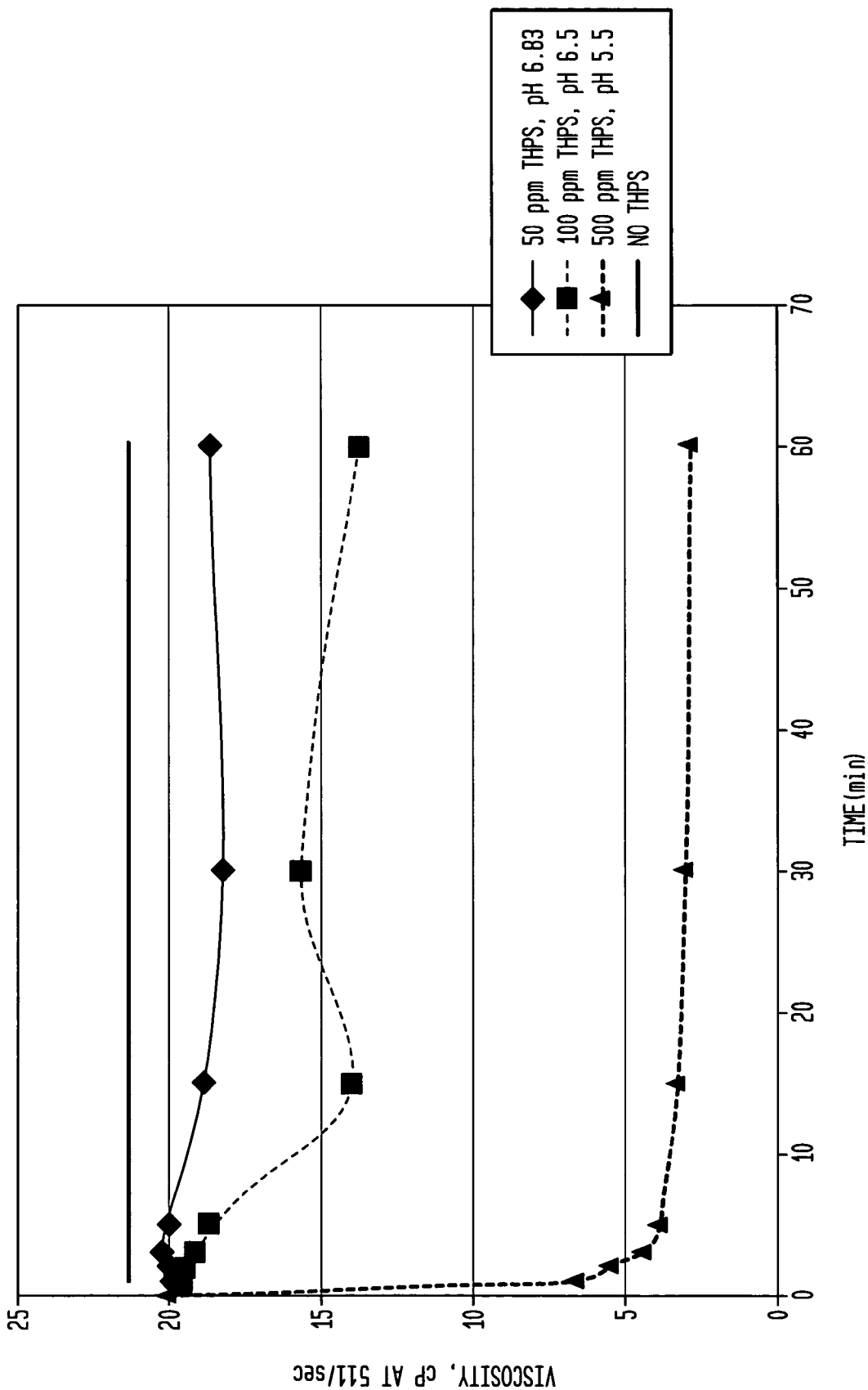
FIG. 3 is a chart illustrating the effect of THPS on the viscosity of a synthetic polymer composition versus time.

FIG. 3 is a graphical representation of Table 1B.

The molecular weight of the sample without THPS and the one with 500 ppm THPS were submitted were determined by gel permeation chromatography. No attempt was made to prevent further depolymerization between the viscosity measurement and the molecular weight analysis. The weight average molecular weight of the sample without THPS was 4.1 million and the weight average molecular weight of the sample with 500 ppm THPS was about 200,000. This shows that THPS is effective in decreasing the viscosity and molecular weight.

Example 2B

A 1% solution of Alkafloc EA-173H, a copolymer of acrylamide and acrylic acid is made as follows: To 784 gm of deionized water, 16 gm of potassium chloride is added. Then 8 gm of alkafloc EA-173H is added and stirred for about an hour to build viscosity. The solution was divided into 3 parts as follows:

The first sample was used as a control.

To the $2^{nd}$ sample, 1000 ppm sodiumbicarbonate and 400 ppm potassium carbonate were added and then 1000 ppm THPS was added. The pH of the sample was 7.8.

To the $3^{rd}$ sample, 1000 ppm sodiumbicarbonate, 50 ppm potassium carbonate were added and then 500 ppm THPS was added. The pH of the sample was 8.3

The viscosities of the three samples were measured.

| | Viscosity of 1% Alkafloc EA-173H @ 511/sec, 75 F. | | |
|---|---|---|---|
| Time (minutes) | No THPS | 1000 ppm THPS, pH 7.8 | 500 ppm THPS, pH 8.3 |
| 0 | 19.2 cP | 19.9 | 20.4 cP |
| 3 | 19.2 cP | 19.9 | 20.4 cP |
| 5 | 19.2 cP | 19.8 | 20.7 cP |
| 10 | 19.2 cP | 19.9 | 20.5 cP |
| 15 | 19.2 cP | 19.6 | 20.5 cP |
| 30 | 19.2 cP | 20.3 | 20.5 cP |
| 60 | 19.2 cP | 20.4 | 20.6 cP |
| pH(@60 minutes) | 7.2 | 7.8 | 8.3 |

The effect of THPS in decreasing the viscosity can be controlled or mitigated by adjusting the pH.

Example 3B

In this example, a 1% solution of a 5 million molecular weight polyacrylamide was prepared as follows: To 784 gm of deionized water, 16 gm of potassium chloride is added. Then 8 gm of polyacrylamide is added and stirred for about an hour to build viscosity. The solution was divided into 4 parts 1) No THPS, no pH adjustment, pH 7.2 2) 500 ppm THPS, pH decreased to 3.5 due to THPS addition 3) No THPS, pH adjusted to 3.4 with HCl and 4) 500 ppm sodium bicarbonate and then 500 ppm THPS added, pH 7.1

TABLE 3B

| | Viscosity of 1% polyacrylamide @ 511/sec, 75 F. | | | |
|---|---|---|---|---|
| Time (minutes) | No THPS, pH 7.2 | 500 ppm THPS, pH 3.5 | No THPS, pH 3.4 | 500 ppm THPS, pH 7.1 |
| 0 | 25.9 cP | 25.9 cP | 25.6 cP | 25.9 cP |
| 1 | | 9.7 cP | 25.6 cP | |
| 2 | | | | 24 cP |
| 3 | | 7.2 cP | 25.4 cP | |
| 5 | | 6.9 cP | 25.4 cP | 22.8 cP |
| 15 | | 6.3 cP | 25.2 cP | 19.5 cP |
| 30 | | | 25.4 cP | 19.2 cP |
| 60 | 25.9 cP | 5.2 cP | | 18.6 cP |
| pH(@60 minutes) | pH 7.2 | pH 3.5 | pH 3.4 | pH 7.1 |

This example shows that decreasing the pH alone, without addition of THPS, does not decrease the viscosity. If THPS is not present, the viscosity is almost independent of the pH. It is the presence of THPS that decreases the viscosity and the rate of decrease is controlled by the amount of THPS and the pH of the system.

Example 4B

In this example, the effect of THPS on a 1.5% by wt. of a terpolymer (AMPS:Acrylamide:acrylic acid) is studied along with a control sample without THPS.

To 200 gm of DI water, 4 gm of potassium chloride is added and then, 10 gm of 30% terpolymer emulsion (AMPS: Acrylamide: acrylic acid) is added and then 1 ml of a surfactant Igepal CO-630. Then the pH is adjusted to 5.4. A portion of the sample is put in a high pressure, high temperature viscometer and the viscosity studied as a function of time at 200° F. This is the control sample without THPS and the results are tabulated in Table 4B.

Another sample is prepared with 100 ppm THPS as follows: To 200 gm of DI water, 4 gm of potassium chloride is added and then, 10 gm of 30% terpolymer emulsion (AMPS: Acrylamide: acrylic acid) is added and then 1 ml of a surfactant Igepal CO-630. After allowing sufficient time to develop viscosity, 100 ppm THPS is added to the solution. A portion of the sample is put in a high pressure, high temperature viscometer and the viscosity studied as a function of time at 200 F. This is the sample with THPS and the results are tabulated in Table 4B.

TABLE 4B

Viscosity of terpolymer as a function of time with and without THPS

| 1.5% terpolymer at pH 5.4, control without THPS | | | 1.5% terpolymer at pH 5.4 with 100 ppm THPS | | |
|---|---|---|---|---|---|
| Time (minutes) | Viscosity, cP @ 100/sec | T (F.) | Time (minutes) | Viscosity, cP @ 100/sec | T (F.) |
| 0 | 250 | 80 | 0 | 268 | 76 |
| 5 | 337 | 112 | 5 | 264 | 128 |
| 10 | 231 | 190 | 10 | 100 | 187 |
| 15 | 208 | 200 | 15 | 63 | 201 |
| 20 | 201 | 200 | 20 | 50 | 201 |
| 25 | 198 | 200 | 25 | 39 | 201 |

TABLE 4B-continued

Viscosity of terpolymer as a function of time with and without THPS

| 1.5% terpolymer at pH 5.4, control without THPS | | | 1.5% terpolymer at pH 5.4 with 100 ppm THPS | | |
|---|---|---|---|---|---|
| Time (minutes) | Viscosity, cP @ 100/sec | T (F.) | Time (minutes) | Viscosity, cP @ 100/sec | T (F.) |
| 30 | 207 | 200 | 30 | 35 | 201 |
| 40 | 213 | 200 | 40 | 27 | 201 |
| 50 | 217 | 201 | 50 | 23 | 201 |
| 60 | 221 | 201 | 60 | 19 | 201 |
| 90 | 223 | 201 | 90 | 12 | 201 |

This shows that there is a significant decrease in the viscosity of the terpolymer solution due to the presence of THPS.

Example 5B

The effect of pH in the presence of THPS on the molecular weight of polyacrylamide is shown here. The molecular weight of a 0.1% polyacrylamide solution is measured without THPS and with 50 ppm THPS and pH adjusted to 7.8, 5.1 and 3.8 at different time intervals and the results are shown in Table 5B.

TABLE 5B

Molecular weight of polyacrylamide with THPS at different time intervals

| | Weight average molecular weight | | | |
|---|---|---|---|---|
| Time | 0.1% Polyacrylamide without THPS | 0.1% polyacrylamide with 50 ppm THPS, pH 7.8 | 0.1% polyacrylamide with 50 ppm THPS, pH 5.1 | 0.1% polyacrylamide with 50 ppm THPS, pH 3.8 |
| 0 | 4,040,000 | | | |
| 30 minutes | | 4,080,000 | 4,280,000 | 486,000 |
| 1 hour | | 4,210,000 | 4,250,000 | 457,000 |
| 4 hours | | 3,510,000 | 4,000,000 | 412,000 |
| 24 hours | | 4,530,000 | 3,080,000 | 392,000 |

The present invention, therefore, is well adapted to carry out the objects and attain the ends and advantages mentioned, as well as others inherent therein. While the invention has been depicted and described and is defined by reference to particular embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method of controlling the rate of depolymerization of a polymer in an aqueous polymer composition comprising:
    obtaining an aqueous mixture comprising a tetrakis(hydroxymethyl)phosphonium salt (THP salt) in an amount of 250 ppm or more,
    adjusting the pH of the THP salt-water mixture to a pH range of from about 4 to about 8; and contacting the THP salt-water mixture with the polymer to form an aqueous polymer composition, wherein the polymer is selected from the group consisting of guar, carboxymethyl guar, hydroxyethyl guar, hydroxypropyl guar, carboxymethylhydroxypropyl guar, cationic guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, and hydrophobically modified cationic guar.

2. The method of claim 1 wherein the polymer is selected from the group consisting of cationic hydrophobically modified hydroxypropyl guar, and hydrophobically modified cationic guar.

3. The method of claim 1 wherein the THP salt is selected from the group consisting of tetrakis(hydroxymethyl)phosphonium sulfate, tetrakis(hydroxymethyl)phosphonium chloride, tetrakis(hydroxymethyl)phosphonium phosphate, tetrakis(hydroxymethyl)phosphonium bromide, tetrakis(hydroxymethyl)phosphonium carbonate, tetrakis(hydroxymethyl)phosphonium acetate, tetrakis(hydroxymethyl)phosphonium citrate, tetrakis(hydroxymethyl)phosphonium formate, tetrakis(hydroxymethyl)phosphonium lactate and tetrakis(hydroxymethyl)phosphonium borate.

4. The method of claim 1 wherein the THP salt is tetrakis(hydroxymethyl)phosphonium sulfate (THPS).

5. The method of claim 1 wherein the step of adjusting the pH of the THP salt-water mixture comprises contacting a predetermined amount of a pH buffer to the THPS-water mixture.

6. The method of claim 5 wherein the pH buffer is selected from the group consisting of amines, alkali metal glycerophosphates, alkali metal orthophosphates, alkali metal hydroxides, carbonates, alkanolamines, silicates, citrates, acetates, phosphates, a triethanolamine, diethanolamine or monoethanolamine, fumaric acid, sulfamic acid, citric acid, adipic acid, acetic acid, potassium carbonate, sodium carbonate, sodium bicarbonate and mixtures thereof.

7. The method of claim 1 whereby the viscosity of the aqueous polymer composition after a predetermined time is not less than 80% of an initial viscosity.

8. The method of claim 7 wherein the predetermined time is 60 minutes.

9. The method of claim 1 whereby the viscosity of the aqueous polymer composition after a predetermined time is not less than 70% of an initial viscosity.

10. The method of claim 9 wherein the predetermined time is 60 minutes.

11. The method of claim 1 wherein the amount of THP salt is greater than about 500 ppm.

12. The method of claim 1 whereby the rate of depolymerization of the polymer is inversely proportional to the pH of the aqueous polymer composition.

13. The method of claim 1 whereby the aqueous polymer composition is an oilfield application fluid.

14. The method of claim 13 wherein the oilfield application fluid is a fracturing fluid or a stimulation fluid.

15. A method of controlling the rate of depolymerization of a polymer during a biocide treatment in preparing an oil field application fluid, comprising:

contacting a pH buffer with water to form a first aqueous mixture, wherein the pH buffer is present in an amount effective to maintain the first aqueous mixture within a pH range of from about 4 to about 8;

contacting the first aqueous mixture with an amount of a THP salt to form a second aqueous mixture wherein the THP salt is present in an amount of 250 ppm or more and is effective to reduce bacteria count in the second aqueous mixture, wherein pH of the second aqueous mixture is maintained within a pH range of from about 4 to about 8, and contacting the second aqueous mixture with the polymer, wherein the polymer is selected from the group consisting of guar, carboxymethyl guar, hydroxyethyl guar, hydroxypropyl guar, carboxymethylhydroxypropyl guar, cationic guar, hydrophobically modified guar, hydrophobically modified carboxymethyl guar, hydrophobically modified hydroxyethyl guar, hydrophobically modified hydroxypropyl guar, cationic hydrophobically modified hydroxypropyl guar, hydrophobically modified carboxymethylhydroxypropyl guar, and hydrophobically modified cationic guar.

16. The method of claim 15 wherein the polymer is selected from the group consisting of cationic guar, cationic hydrophobically modified hydroxypropyl guar, and hydrophobically modified cationic guar.

17. The method of claim 15 wherein the THP salt is selected from the group consisting of tetrakis(hydroxymethyl)phosphonium sulfate, tetrakis(hydroxymethyl)phosphonium chloride, tetrakis(hydroxymethyl)phosphonium phosphate, tetrakis(hydroxymethyl)phosphonium bromide, tetrakis(hydroxymethyl)phosphonium carbonate, tetrakis(hydroxymethyl)phosphonium acetate, tetrakis(hydroxymethyl)phosphonium citrate, tetrakis(hydroxymethyl)phosphonium formate, tetrakis(hydroxymethyl)phosphonium lactate and tetrakis(hydroxymethyl)phosphonium borate.

18. The method of claim 15 wherein the THP salt is tetrakis(hydroxymethyl)phosphonium sulfate (THPS).

19. The method of claim 15 wherein the pH buffer is selected from the group consisting of amines, alkali metal glycerophosphates, alkali metal orthophosphates, alkali metal hydroxides, carbonates, alkanolamines, silicates, citrates, acetates, phosphates, a triethanolamine, diethanolamine or monoethanolamine, fumaric acid, sulfamic acid, citric acid, adipic acid, acetic acid, potassium carbonate, sodium carbonate, sodium bicarbonate and mixtures thereof.

20. The method of claim 15 wherein the amount of pH buffer utilized is effective to maintain the second aqueous mixture within a pH of from about 6 to about 8.

21. The method of claim 15 wherein the amount of pH buffer utilized is effective to maintain the second aqueous mixture within a pH of from about 7 to about 8.

* * * * *